United States Patent Office 3,527,727
Patented Sept. 8, 1970

3,527,727
POLYMERS PLASTICIZED BY BIS(3-HALO-ALKOXY)METHANES
Clarence R. Bresson and Paul R. Stapp, Bartlesville, Okla., assignors to Phillips Petroleum Company, a corporation of Delaware
No Drawing. Filed Apr. 13, 1967, Ser. No. 630,504
Int. Cl. C08f 45/34, 45/40
U.S. Cl. 260—31.8                               7 Claims

ABSTRACT OF THE DISCLOSURE

Vinyl polymers and copolymers are plasticized by bis-(3-haloalkoxy)methanes. The bis(3-haloalkoxy)methanes can be used as primary plasticizers or as secondary plasticizers with other known plasticizers.

---

This invention relates to the plasticization of normally solid compounds. In another aspect, this invention relates to plasticized compositions of vinyl polymers and copolymers and mixtures thereof.

One object of this invention is to provide novel plasticizers for normally solid compounds.

A further object of this invention is to provide compositions comprising compounds selected from vinyl polymers and copolymers and mixtures thereof with bis(3-haloalkoxy)methanes, or mixtures of these formals and other known plasticizers.

I have discovered that compounds selected from the group of vinyl polymers and copolymers and mixtures thereof, can be effectively plasticized by incorporation therein of compounds having the general formula

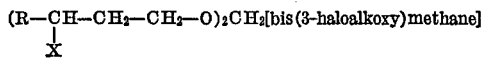
[bis(3-haloalkoxy)methane]

wherein R is an alkyl group containing 1–7 carbon atoms and X is a halogen selected from chlorine, bromine, or fluorine, preferably chlorine. If desired, the formals can be mixed with other known plasticizers and incorporated into the above-described polymers.

Bis(3-haloalkoxy)methanes used in this invention are known compounds and, for example, can be prepared from the reaction of 1-olefins, formaldehyde, and hydrogen halide as described in Chem. Rev. 51,505 (1952), or by any convenient method. Examples of bis(3-haloalkoxy)methanes include bis(3-chlorobutoxy)methane, bis-(3-chloropentoxy)methane, bis(3-fluorobutoxy)methane, bis(3-chloro-5-methylhexoxy)methane, bis(3-bromodecoxy)methane, bis(3-chloro-6,6-dimethylheptoxy)methane, bis(3-fluoropentoxy)methane, and bis(3-chlorooctoxy)methane.

These formal plasticizers can be incorporated into the above stated polymers in any desired amount, but preferably the plasticizer is used in the range of from 10 to 100 parts by weight formal plasticizer per 100 parts of polymer by weight. When the bis(3-haloalkoxy)methanes are used as secondary plasticizers with other known primary plasticizers, preferably from 1 to 9 parts by weight of the primary plasticizer or plasticizers are used for each part by weight of the formal. The ratio of the resulting primary and secondary plasticizer blend to the above-described polymeric compounds should be preferably from 20 to 200 parts by weight of the said blend per 100 parts by weight of the above-described polymers. However, the ratio used can be either higher or lower than the preferred range depending upon the particular plasticizers used. Examples of other known plasticizers that can be employed with the bis(3-haloalkyoxy)methanes are dioctyl phthalate, dihexyl phthalate, dicapryl phthalate, 2000–8000 mol. wt. polyesters, tricresyl phosphate, 1000 mol. wt. chlorinated paraffins, didecyl adipate, diethylene glycol dibenzoate, and the like as well as other conventional plasticizers such as adipates, azelates, epoxy types, glycolates, etc.

Vinyl polymers that can be used in this invention include those made from vinyl monomers, $CH_2=CHX$ wherein X can be any substituent but hydrogen or alkyl groups. Examples of the polymers of vinyl monomers include poly(vinyl chloride), poly(vinyl acetate), poly-(vinyl alcohol), poly(vinyl acetal), poly(vinyl ethers), poly(vinylpyrrolidone), and poly(vinylcarbazole). Examples of copolymers of vinyl monomers that can be used in this invention are vinyl chloride-vinyl acetate copolymer, vinyl chloride-vinyl alcohol copolymer, vinyl acetate-vinyl ether copolymer, and the like. A preferred group of vinyl polymers and copolymers include polymers of vinyl chloride, vinyl alcohol, vinyl acetate and copolymers of combinations of these and blends of the homopolymers of these.

The bis(3-haloalkoxy)methanes with or without other known plasticizers can be incorporated into the above-stated polymeric compounds by any conventional means such as blending or milling or rolling processes which, for example, use a Banbury mixer or a heated roll mill. Generally, the mixing temperatures are at least as high as the softening point of the polymers.

The following example will illustrate the invention in better detail but it is not to be construed as limiting the invention.

EXAMPLE

A test sample was made by incorporating bis(3-chlorobutoxy)methane into poly(vinyl chloride) by the formulation:

|  | Phr. |
|---|---|
| Poly(vinyl chloride) [1] | 100 |
| Bis(3-chlorobutoxy)methane | 50 |
| Stabilizer [2] | 2 |
| Stearic acid [3] | 1 |

The following physical tests were performed on the above sample of plasticizer polymer:

[1] ASTM D1755–60T Classification GP-6-15443.
[2] Commercial organotin heat stabilizer.
[3] Lubricant.

Durometer, 10 sec., 81, ASTM D1706
Tensile Break, p.s.i., 3127, ASTM D412
Elongation Break, percent, 320, ASTM D412
100% Modulus, p.s.i., 1715, ASTM D412
Brittleness Temp. ° F., −53, ASTM D746
Clash-Berg, ° F., −49, ASTM D1043
Carbon volatility, percent, 10.28, ASTM D1203

The data clearly indicates that bis(3-chloro-1-butoxy) methane is an effective plasticizer with particularly good properties under low temperature conditions.

The bis(3-chloroalkoxy)methanes can also be used as secondary plasticizers. A typical formulation is given below:

Vinylchloride-vinylacetate copolymer—100 phr.
Dioctyl phthalate—30 phr.
Bis(3-chloropentoxy)methane—20 parts
Lubricants, stabilizers, colorants and other additives—5 phr.

We claim:
1. A composition comprising 100 parts by weight of at least one vinyl polymer selected from poly(vinyl chloride), poly(vinyl acetate), poly(vinyl alcohol), poly(vinyl acetal), poly(vinyl ether), poly(vinylpyrrolidone), poly-(vinylcarbazole), vinyl chloride-vinyl acetate copolymer, vinyl chloride-vinyl alcohol copolymer, or vinyl acetate- vinyl ether copolymer, with from 10 to 100 parts by weight of a first plasticizer having the formula

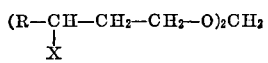

wherein R is an alkyl group having from 1–7 carbon atoms and X is a halogen selected from chlorine, bromine, and fluorine.

2. Composition of claim 1 wherein said vinyl polymer is poly(vinyl chloride) and said first plasticizer is bis(3-chlorobutoxy)methane.

3. Composition of claim 2 wherein the weight ratio between said poly(vinyl chloride) and said first plasticizer is about 2:1.

4. Composition of claim 1 comprising from 1–9 parts by weight of a second plasticizer per part by weight of said first plasticizer.

5. Composition of claim 4 wherein said second plasticizer is dioctyl phthalate.

6. Composition of claim 5 wherein said vinyl polymer is vinyl chloride-vinyl acetate copolymer and said first plasticizer is bis(3-chloropentoxy)methane.

7. Composition of claim 6 wherein about 20 parts by weight of said first plasticizer and about 30 parts by weight of said second plasticizer are mixed with every 100 parts by weight of said vinyl polymer.

References Cited

UNITED STATES PATENTS

| | | | |
|---|---|---|---|
| 2,435,464 | 2/1948 | Radcliffe. | |
| 2,513,642 | 7/1950 | Gresham | 260—33.2 |
| 2,782,177 | 2/1957 | Fischer et al. | 260—33.2 |
| 2,802,804 | 8/1957 | Reid et al. | 260—33.2 |
| 2,958,669 | 11/1960 | Hoffmann | 260—33.2 |

MORRIS LIEBMAN, Primary Examiner

H. H. FLETCHER, Assistant Examiner

U.S. Cl. X.R.

260—30.4, 30.6, 31.6, 33.8